| (12) | United States Patent<br>Kim | (10) Patent No.: US 11,080,531 B2<br>(45) Date of Patent: Aug. 3, 2021 |
|---|---|---|

(54) EDITING MULTIMEDIA CONTENTS BASED ON VOICE RECOGNITION

(71) Applicant: LG ELECTRONICS INC., Seoul (KR)

(72) Inventor: Seunghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/810,668

(22) Filed: Mar. 5, 2020

(65) Prior Publication Data

US 2021/0192216 A1 Jun. 24, 2021

(30) Foreign Application Priority Data

Dec. 18, 2019 (KR) .................. 10-2019-0170029

(51) Int. Cl.
```
G06K 9/00      (2006.01)
G11B 27/00     (2006.01)
G10L 15/22     (2006.01)
G11B 27/034    (2006.01)
H04N 5/93      (2006.01)
```

(52) U.S. Cl.
CPC ..... *G06K 9/00718* (2013.01); *G06K 9/00765* (2013.01); *G10L 15/22* (2013.01); *G11B 27/034* (2013.01); *G06K 2009/00738* (2013.01); *G10L 2015/223* (2013.01)

(58) Field of Classification Search
USPC .................. 386/280, 278, 239, 240, 241
See application file for complete search history.

(56) References Cited

U.S. PATENT DOCUMENTS

| 8,218,945 | B2 * | 7/2012 | Hiroi | H04N 5/76<br>386/278 |
|---|---|---|---|---|
| 8,938,154 | B2 * | 1/2015 | Sambongi | H04N 9/79<br>386/242 |
| 2015/0035835 | A1 * | 2/2015 | Fay | G06T 11/206<br>345/440 |
| 2018/0276508 | A1 * | 9/2018 | Crabtree | G06Q 30/0201 |
| 2019/0370283 | A1 * | 12/2019 | Church | G06F 16/483 |
| 2020/0226729 | A1 * | 7/2020 | Zhang | G06T 7/174 |

* cited by examiner

*Primary Examiner* — Daquan Zhao
(74) *Attorney, Agent, or Firm* — Birch, Stewart, Kolasch & Birch, LLP

(57) ABSTRACT

Disclosed are a content editing apparatus and method capable of editing a video filmed by a personal terminal in a 5G communication environment. The content editing apparatus of the present disclosure includes a processor, a memory operatively connected to the processor and which stores at least one code configured to be executed by the processor, and an interface for receiving a video. The memory stores codes that, when executed by the processor, cause the processor to recognize a set wake-up word from the video, and edit the video based on an editing command recognized within an interval of a preset time from a portion where the wake-up word of the video is located.

17 Claims, 12 Drawing Sheets

EDITING MULTIMEDIA CONTENTS BASED ON VOICE RECOGNITION

CROSS-REFERENCE TO RELATED APPLICATION

This present application claims the benefit of priority to Korean Patent Application No. 10-2019-0170029, entitled "EDITING MULTIMEDIA CONTENTS BASED ON VOICE RECOGNITION," filed on Dec. 18, 2019, in the Korean Intellectual Property Office, the entire disclosure of which is incorporated herein by reference.

BACKGROUND

1. Technical Field

The present disclosure relates to a content editing apparatus and method for editing a video based on a wake-up word and an editing command recognized from the video.

2. Description of Related Art

As content (for example, games, beauty, fashion, eating shows, and cooking shows) diversifies, and the Internet, which is the basis for distributing content, continues to develop rapidly, the common notion that only traditional large media corporations can broadcast content is being broken, and anyone can easily produce and distribute broadcast content. Accordingly, personal media broadcasting is spreading.

The advantage of personal media broadcasting is that after generating their own desired content and producing the content through an editing process, individuals can easily distribute the produced content via the Internet. In other words, it is possible for individuals to participate in the media as producers, not just as consumers.

However, it is not easy for individuals to produce content for high quality broadcasting that can secure consumers. Accordingly, in order to produce high-quality broadcast content, some famous content creators commission separate specialized content editing companies to edit their content for a fee.

In addition, even if high-quality broadcast content is not produced, for personal media broadcasting, there are inconveniences for an individual to create content using a personal terminal, and edit the created content one by one to suit the individual's personal style.

Accordingly, there is a need for an editing technique capable of providing content having a quality above a certain level, without requiring an individual to edit created content one by one.

SUMMARY OF THE INVENTION

The present disclosure is directed to reducing inconvenience for an individual in editing videos one by one and reducing a cost burden of editing content having a quality above a certain level, by automatically editing a video received from a personal terminal based on a wake-up word and an editing command in the received video.

In addition, the present disclosure is directed to determining a category of a video received from a personal terminal and editing the video based on a template corresponding to the determined category, while also editing the template according to a template created based on other videos associated with the personal terminal, thereby making it possible to easily edit a video filmed by a personal terminal in accordance with a personal style.

A content editing apparatus according to an embodiment of the present disclosure may include a processor, a memory operatively connected to the processor and storing at least one code configured to be executed by the processor, and an interface configured to receive a video. The memory stores codes configured to, when executed by the processor, cause the processor to recognize a set wake-up word from the video and edit the video based on an editing command recognized within an interval of a preset time from a portion where the wake-up word of the video is located.

A method for editing content according to another embodiment of the present disclosure, performed by a content editing apparatus including a processor, may include receiving a video by an interface of the content editing apparatus, recognizing a set wake-up word from the video by the processor, and editing the video based on an editing command recognized within an interval of a preset time from a portion where the wake-up word of the video is located, by the processor.

In addition to these embodiments, another method and system for implementing the present disclosure, and a computer-readable recording medium storing a computer program for executing the method may be further provided.

The above and other aspects, features, and advantages of the present disclosure will become apparent from the detailed description of the following aspects in conjunction with accompanying drawings.

According to the present disclosure, by automatically editing a video received from a personal terminal based on a wake-up word and an editing command in the received video, inconvenience for an individual in editing videos one by one can be reduced, and a cost burden of editing content having a quality above a certain level can be reduced.

In addition, according to the present disclosure, by determining a category of a video received from a personal terminal and editing the video based on a template corresponding to the determined category, while also editing the template according to a template created based on other videos associated with the personal terminal, a video filmed by a personal terminal can easily be edited in accordance with a personal style.

DETAILED DESCRIPTION

Figure 1:
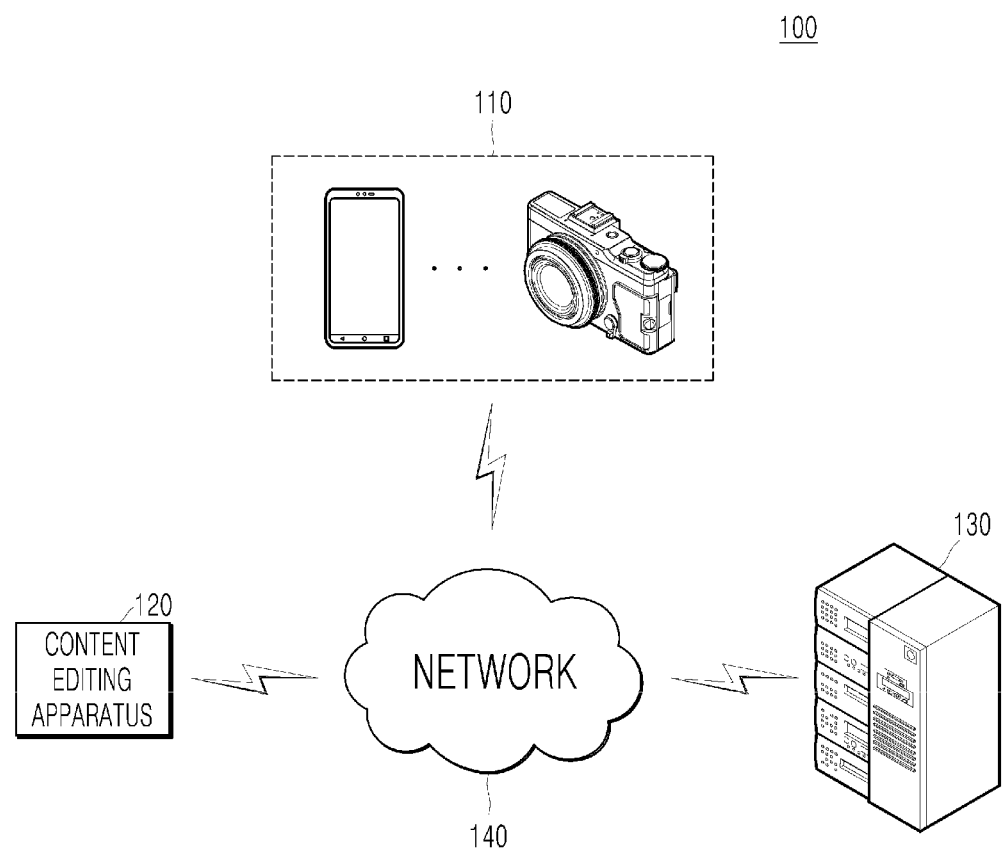
FIG. 1 is an illustration of a driving environment of a content editing apparatus including a content editing apparatus, a personal terminal, a content server, and a network connecting them to one another, according to an embodiment of the present disclosure.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is an illustration of a driving environment of a content editing apparatus including a content editing apparatus, a personal terminal, a content server, and a network connecting them to one another, according to an embodiment of the present disclosure.

Referring to FIG. 1, a driving environment 100 of a content editing apparatus may include a personal terminal 110, a content editing apparatus 120, a content server 130, and a network 140. In addition, the driving environment 100 of the content editing apparatus may further include an artificial intelligence server.

The personal terminal 110 is a device that supports video filming, and may be, for example, a camcorder, a digital camera, a smartphone, a laptop, and a tablet PC, but is not limited thereto. Also, the personal terminal 110 may be a wearable terminal implemented with communication functionality and data processing functionality, such as a wearable watch, wearable glasses, a wearable hairband, and a wearable ring. The personal terminal 110 is not limited to the above description, and a terminal capable of wired or wireless communication with the content editing apparatus 120 may be borrowed without limitation.

The personal terminal 110 may film a video or transmit a filmed video to the content editing apparatus 120 through the network 140.

The content editing apparatus 120 may receive a video from the personal terminal 110, and edit the received video in accordance with a video editing style of an individual possessing the personal terminal 110. The content editing apparatus 120 may receive another video that has been uploaded to the content server 130 by the personal terminal 110, and may create a template for each category (or a style of a scene in the template for each category) based on the received other video. The content editing apparatus 120 can easily apply an editing style for each category by editing the video received from the personal terminal 110 based on the created template for each category. In this case, the content editing apparatus 120 may determine the category of the video received from the personal terminal 110 based on a set plurality of categories from the other video, or may apply an image classification algorithm to the received video to determine the category of the video, and may edit the received video based on a template corresponding to the determined category.

The content editing apparatus 120 may transmit a video received from the personal terminal 110 to an artificial intelligence server (not shown), and may receive a result of determination of a category of the video and a template of a category corresponding to the result of determination (or a style of a scene in the template of the category) from the artificial intelligence server.

The artificial intelligence server may be a database server that provides big data necessary for applying various artificial intelligence algorithms (for example, videos related to various content), and various service information based on the big data. Upon the artificial intelligence server receiving a video from the personal terminal 110, the personal terminal 110 may acquire another video that has been uploaded to the content server 130 from the content server 130, and create a template for each category (or a style of a scene in the template for each category) based on the acquired other video. Thereafter, the artificial intelligence server provides the content editing apparatus 120 with a result of determination for the category of the video received from the personal terminal 110 and a template (or a style of a scene in the template of the category) of the category corresponding to the result of determination, and performs some operations of the content editing apparatus 120 on behalf of the content editing apparatus 120. Accordingly, the operations of the content editing apparatus 120 are distributed, and the editing process can be performed more quickly.

In addition, when determining the category of the video, the artificial intelligence server may determine a category of the video by applying an image classification algorithm to the video, and when a request for an image classification algorithm is received from the personal terminal 110, as a response to the request, only an image classification algorithm may be provided.

The content editing apparatus 120 may provide the personal terminal 110 with the edited video, and in response to a request for uploading the edited video from the personal terminal 110, the edited video may be transmitted to the content server 130. In this case, the content editing apparatus 120 may provide an environment in which the personal terminal 110 may re-edit the edited video to further improve the quality of the video.

The content server 130 may receive a video related to various content not only from the personal terminal 110 but also from a plurality of personal terminals for different individuals (not shown), and may manage videos for each individual. In addition, working in conjunction with a content request from a personal terminal of another individual, the content server 130 may provide the personal terminal of the other individual with a video (for example, a video created by the personal terminal 110 of the individual) associated with the content request. Accordingly, video content can be shared with other individuals.

The network 140 may connect the personal terminal 110, the content editing apparatus 120, the artificial intelligence server, and the content server 130. The network 140 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 140 may transmit/receive information using short-range communications and/or long-distance communications. The short-range communication may include Bluetooth®, radio frequency identification (RFID), infrared data association (IrDA), ultra-wideband (UWB), ZigBee, and wireless-fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 140 may include connection of network elements such as hubs, bridges, routers, switches, and gateways. The network 140 may include one or more connected networks, for example, a multi-network environment, including a public network such as an Internet, and a private network such as a secure corporate private network. Access to the network 140 may be provided via one or more wired or wireless access networks. Furthermore, the network 140 may support 5G communication and/or an Internet of things (IoT) network for exchanging and processing information between distributed components such as objects.

Figure 2:
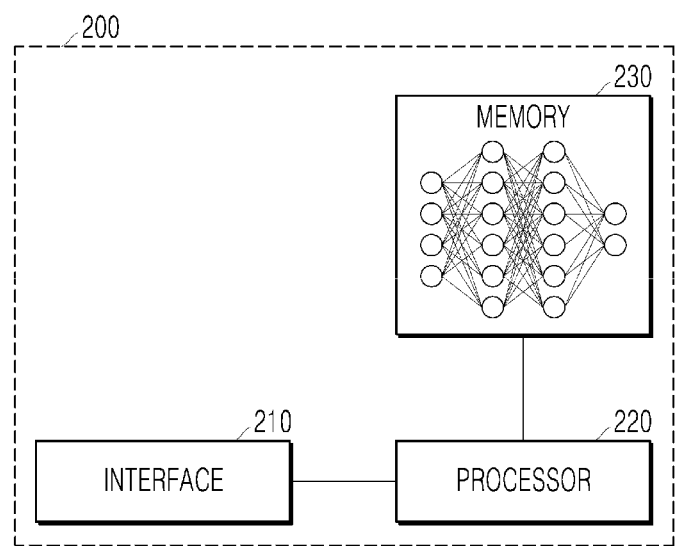
FIG. 2 is a diagram illustrating a configuration of a content editing apparatus according to an embodiment of the present disclosure.

FIG. 2 is a diagram illustrating a configuration of a content editing apparatus according to an embodiment of the present disclosure.

Referring to FIG. 2, the content editing apparatus 200 according to an embodiment of the present disclosure may include an interface 210, a processor 220, and a memory 230.

The interface 210 may receive a video, for example, from a personal terminal (or a storage device), and transmit the received video (that is, a first video) to the processor 220.

Here, the video may be a video related to any one of various types of content (for example, games, beauty, fashion, eating shows, and cooking shows).

In addition, upon the video being received from the personal terminal (for example, a camcorder, a digital camera, and a smartphone), another video (that is, a second video) associated with the personal terminal (or the video) is requested from a content server, and the interface 210 may receive another video from the content server and transmit the received other video to the processor 220.

The processor 220 may edit the video received from the interface 210. Specifically, the processor 220 may recognize a set wake-up word from the video, and may edit the video based on an editing command (for example, an image start command, an image end command, and an additional command) recognized within an interval of a preset time (for example, 3 seconds) from a portion (or point of time) where a wake-up word of the video is located. Accordingly, the processor 220 may reduce inconvenience for an individual in editing videos one by one, and may reduce the cost burden of editing content having a quality above a certain level.

The processor 220 may recognize an image start command and an image end command among the editing commands, and may edit the video based on an image frame from a first time point corresponding to the image start command to a second time point corresponding to the image end command in the video. In other words, the processor 220 may acquire, from the received video, an image frame from a first time point corresponding to the image start command to a second time point corresponding to the image end command. When there are a plurality of acquired image frames, the processor 220 may edit the video by connecting the plurality of image frames such that the plurality of image frames are reproduced in the order in which they were acquired (or filmed).

In addition, among the editing commands, the processor 220 may recognize an additional command related to a context (for example, from speech of "Film from before the 'car' appears" or "Remove all scenes in which the 'car' appears", the context of 'car appears' and additional commands of 'film from before' and 'remove all scenes' may be recognized), and may edit the video based on at least one image frame corresponding to the context of the additional command in the video. In this case, the processor 220 may change the location of at least one image frame corresponding to the context of the additional command in the video. For example, when a plurality of image frames acquired from the video are connected, the processor 220 may change the connecting parts based on an additional command related to the context. An example thereof will be described below with reference to FIGS. 3 and 4.

In order to determine an image frame related to the context, the content editing apparatus 200 may include a learning model that can recognize an object included in an image frame, an operation of the object, and scene content of the frame. Learning models for object recognition may include neural network structures such as a convolutional neural network (CNN), a region based CNN (R-CNN), a convolutional recursive neural network (C-RNN), Fast R-CNN, Faster R-CNN, a region based fully convolutional network (R-FCN), You Only Look Once (YOLO), or Single Shot Multibox Detector (SSD). The learning model capable of recognizing the operation of an object or the scene content of a frame in an image frame may include neural network structures such as a CNN, a recurrent neutral network (RNN), a long short term memory (LSTM), and Faster R-CNN structure.

The processor 220 may determine a category of a video (or a video edited based on a wake-up word and an editing command) received from the interface 210, and may edit the video based on a template corresponding to the determined video category.

First, the processor 220 may set the plurality of categories based on the other video transmitted from the interface 210. Here, the processor 220 may create a template for each of the plurality of categories set based on the other video, or receive a plurality of templates for each category from an artificial intelligence server through the interface 210, and store the template for each of the plurality of categories in the memory 230. The processor 220 may create a template of a specific category by extracting scenes having a common context from a plurality of videos based on a plurality of videos determined to be the same category.

The other video may be, for example, a video uploaded to a content server according to a personal account for content of a personal terminal. Accordingly, the processor 220 may set a template for each of a plurality of categories based on the other video and store them in the memory 230, so that an environment for editing the received video may be provided in accordance with a video editing format of the individual who possesses the personal terminal.

Thereafter, the processor 220 may determine the category of the video, acquire a template corresponding to the category of the video from the memory 230, and edit the video based on the acquired template, so that the video may be edited according to characteristics of the category to which the video belongs.

In this case, the processor 220 may determine a category to which the video belongs based on the set plurality of categories, or determine the category of the video by applying an image classification algorithm to the video.

The processor 220 may compare the scene structure of the video with the scene structure of the template, and edit the video based on the scene structure of the template. Here, the processor 220 may compare each scene of the video with each scene of the template, and insert into the video at least some scenes that do not correspond to the scenes of the video among the scenes of the template. For example, as a result of comparing each scene of the video with each scene of the template, when the video does not include an intro image (or scene) and an ending image (or scene), the processor 220 may edit the video by inserting an intro image and an ending image in the template into the video. In this case, the processor 220 may insert the intro image and the ending image into the video by referring to the locations of each of the intro image and the ending image in the template.

In this case, when a location (or an order of arrangement) of each scene is different as a result of comparing each scene of the video and each scene of the template, the processor 220 may change the location of each scene of the video based on each scene of the template.

In addition, the processor 220 may check whether each scene of the video corresponds to each scene of the template, and change a style of a scene of the video based on a style of a scene of the template corresponding to the scene of the video. Specifically, the processor 220 may change a style of a scene of the video based on at least one of color, chroma, brightness, an applied image filter, a title style, or a subtitle style of the scene of the template corresponding to the scene of the video. In other words, the processor 220 can easily edit the video filmed by a personal terminal according to a personal style by editing the video according to a template created based on another video associated with the personal terminal.

The memory 230 is operatively connected to the processor 220, and may store at least one code in association with an operation performed by the processor 220. In addition, the memory 230 may further store a template for each of the plurality of categories.

Figure 3:
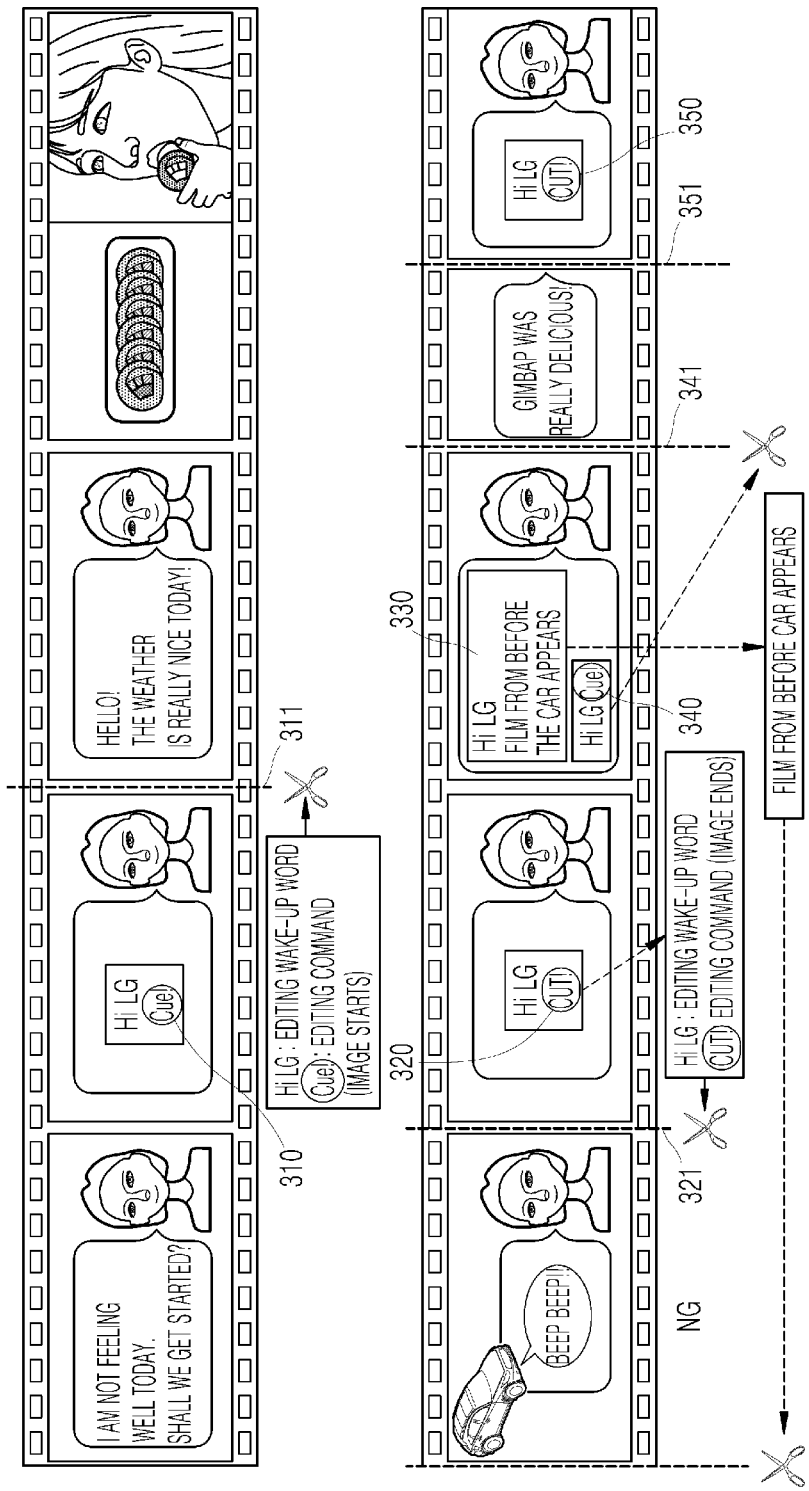
FIGS. 3 and 4 are diagrams for explaining an example of editing a video in a content editing apparatus according to an embodiment of the present disclosure.
Figure 4:
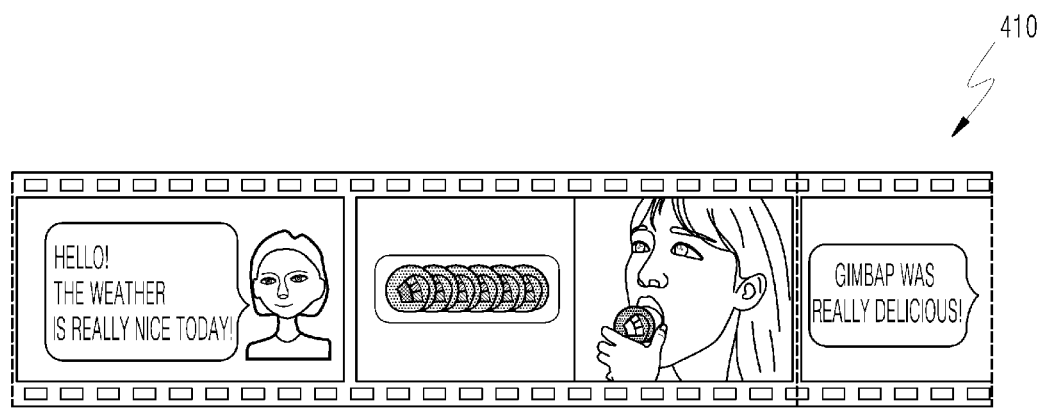

FIGS. 3 and 4 are diagrams for explaining an example of editing a video in a content editing apparatus according to an embodiment of the present disclosure.

Referring to FIG. 3, when a video is received, the content editing apparatus may recognize a set wake-up word from the video, and edit the video based on an editing command recognized within an interval of a preset time from a portion where the wake-up word of the video is located. Here, the editing command may include, for example, at least one of an image start command, an image end command, or an additional command related to a context.

For example, the content editing apparatus may recognize 'Hi LG' as the wake-up word from video 'A', and recognize 'Cue' 310 as an image start command within an interval of 3 seconds from the portion where the wake-up word is located. In addition, the content editing apparatus may recognize 'Hi LG' as the wake-up word from video 'A' and recognize 'Cut' 320 as an image end command within an interval of 3 seconds from the portion where the wake-up word is located. In this case, the content editing apparatus may acquire, from video 'A', a first image frame from a first time point 311 corresponding to the image start command 'Cue' 310 to a time point 321 corresponding to the image end command 'Cut' 320.

Thereafter, the content editing apparatus may recognize 'Hi LG' as a wake-up word from video 'A,' and recognize 'car' and 'film from before the car appears' 330 as an additional command related to the context within an interval of 3 seconds from the portion where the wake-up word is located. In addition, the content editing apparatus may recognize 'Hi LG' as a wake-up word from video 'A' and recognize 'Cue' 340 as an image start command within an interval of 3 seconds from the portion where the wake-up word is located. In addition, the content editing apparatus may recognize 'Hi LG' as a wake-up word from video 'A' and recognize 'Cut' 350 as an image end command within an interval of 3 seconds from the portion where the wake-up word is located. In this case, a second image frame from the first time point 341 corresponding to the image start command 'Cue' 340 to a time point 351 corresponding to the image end command 'Cut' 350 may be acquired from video 'A.'

Thereafter, the content editing apparatus may connect the first image frame and the second image frame, and edit the first and second image frames such that the first and the second image frames are reproduced consecutively. Here, the content editing apparatus may change a location of at least one image frame corresponding to a context of the additional command (for example, 'car appears', 'dog appears').

For example, as shown in FIG. 4, when the content editing apparatus connects the first and second image frames, by arranging the second image frame at a location following the image frame at a time corresponding to 'before the car appears' in the first image frame, the first image frame and the second image frame may be edited such that the image frame in which the 'car' appears is removed and the first and second image frames are reproduced consecutively, to acquire a final video 410.

In other words, the content editing apparatus adjusts a location to edit in a video based on an additional command related to a context, and an individual can accordingly easily film a video with a reduced editing burden by using additional commands.

Figure 5:
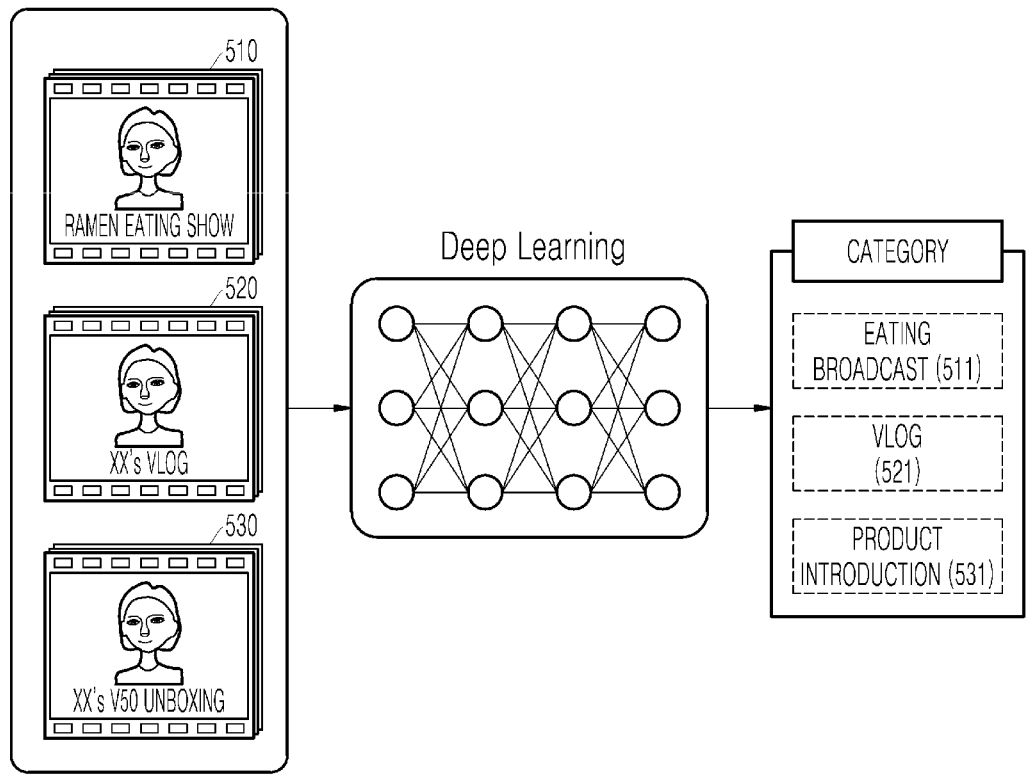
FIGS. 5 and 6 are diagrams for explaining an example of determining a category of a video in a content editing apparatus according to an embodiment of the present disclosure.
Figure 6:
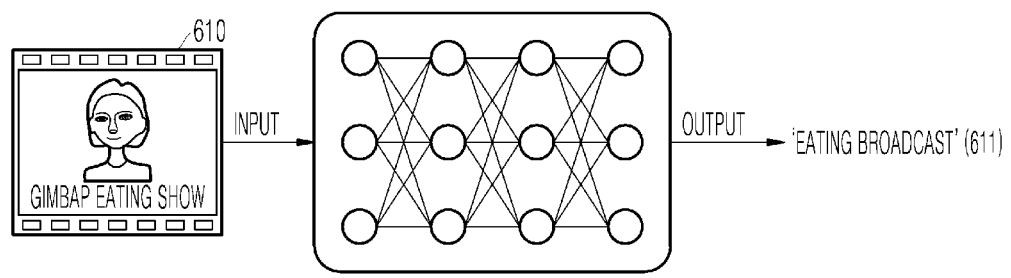

FIGS. 5 and 6 are diagrams for explaining an example of determining a category of a video in a content editing apparatus according to an embodiment of the present disclosure.

Referring to FIG. 5, upon receiving a first video from a personal terminal (for example, a digital camera), the content editing apparatus may receive a second video related to the personal terminal (or related to the first video), for example, from a content server, or may acquire the second video from an internal memory. Here, the second video may be a video associated with the personal terminal (for example, a video uploaded on a content server according to a personal account for content of the personal terminal), and may be one or more videos related to the content.

The content editing apparatus may generate an image classification algorithm, which is a machine learning-based learning model, to classify the category of the video based on a context in each scene of the second video. For example, the content editing apparatus may include a software module or a hardware module (hereinafter, referred to as an artificial intelligence module) that implements artificial intelligence (AI).

The content editing apparatus may perform machine learning to train a machine learning-based learning model to classify the category of a second video through an artificial intelligence module. In other words, the machine learning-based learning model may be trained by receiving a data set including videos and categories to which each video belongs. Specifically, the data set may include videos (input), and, as labels, categories (output).

For example, the machine learning-based learning model of the content editing apparatus may receive, from a content server, a second video_#1 510 (for example, a ramen eating show video), a second video_#2 520 (for example, a VLOG video of person A), and a second video_#3 530 (for example, a video showing an unboxing of product B), as second videos.

When the second video #1 510 is inputted, the machine learning-based learning model of the content editing apparatus may train itself to output 'eating broadcast' 511 specified by a label as a category. When the second video_#2 520 is inputted, the machine learning-based learning model of the content editing apparatus may train itself to output 'VLOG' 521, specified by a label, as a category. In addition, when the second video_#3 530 is inputted, the machine learning-based learning model of the content editing apparatus may train itself to output 'product introduction' 531, specified by a label, as a category.

Thereafter, the content editing apparatus may determine the category of the video by applying the image classification algorithm to the first video received from the personal terminal.

For example, as shown in FIG. 6, when the content editing apparatus receives a first video_#1 610 (for example, a gimbap eating show video) (or an edit request including the first video_#1 610) as the first video from the personal terminal, the category of the first video_#1 610 may be determined as 'eating broadcast' 611 by applying the image classification algorithm to the first video_#1 610.

When the content editing apparatus cannot receive second videos related to the personal terminal (or related to the first video) from the content server or cannot acquire the second videos from the internal memory, the content editing apparatus may receive, from the content server, third videos, which are not related to the personal terminal (or related to the first video) but belong to various categories. The content editing apparatus may generate an image classification algorithm by using the third videos.

Figure 7:
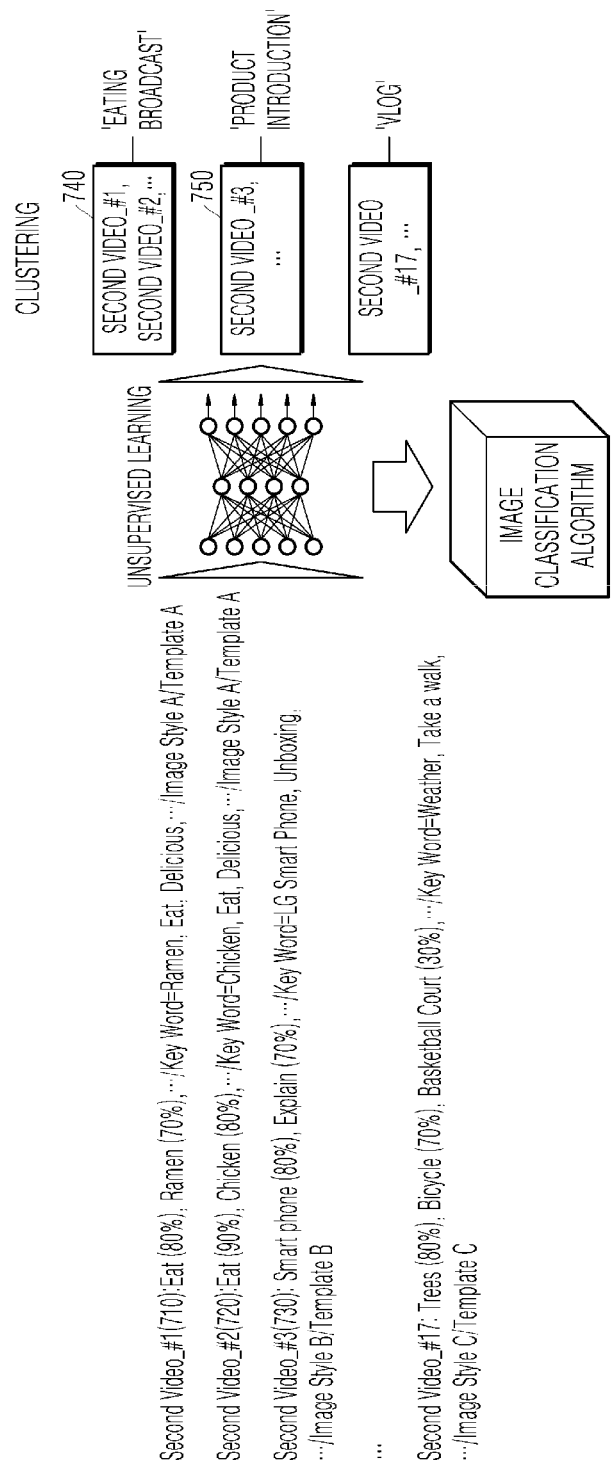
FIGS. 7 and 8 are diagrams for explaining another example of determining a category of a video in a content editing apparatus according to an embodiment of the present disclosure.
Figure 8:
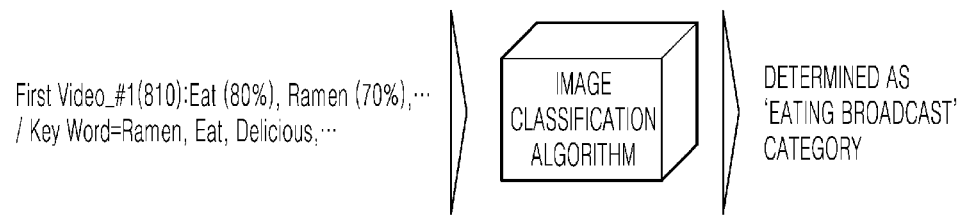

FIGS. 7 and 8 are diagrams for explaining another example of determining a category of a video in a content editing apparatus according to an embodiment of the present disclosure.

Referring to FIG. 7, when the content editing apparatus receives a first video from a personal terminal, the content editing apparatus may receive a second video related to the personal terminal (or related to the first video), for example, from a content server, or may acquire the second video from an internal memory. Here, the second video may be a video associated with the personal terminal (for example, a video uploaded on a content server according to a personal account for content of the personal terminal), and may be one or more videos related to the content.

The content editing apparatus may generate an image classification algorithm via a learning process involving analyzing each scene of the second video, classifying the video into a group to which the video belongs based on an analysis result, and determining a category based on attributes of the classified group.

For example, upon receiving input of a second video_#1 710 (for example, a ramen eating show video), the content editing apparatus may analyze the scenes in the second video_#1 710 and classify the second video_#1 710 into a first group 740 based on the analysis result (for example, eat (80%), ramen (70%), key words=ramen, eat, delicious, image style A, template A), and may determine the category of based on the attributes of the first group 740 as 'eating broadcast.' Accordingly, the content editing apparatus may determine the category of the second video_#1 710, belonging to the first group 740, as 'eating broadcast.'

In addition, when a second video_#2 720 (for example, a chicken eating show video) is inputted, the content editing apparatus may analyze the scenes in the second video_#1 720, and since the second video_#2 720 has a similarity with the second video_#1 710 in the first group 740 that exceeds a set value, the content editing apparatus may classify the second video_#2 720 into the first group 740 based on the analysis result (for example, eat (90%), chicken (80%), key words=chicken, eat, delicious, image style A, template A). Accordingly, the content editing apparatus may also determine the category of the second video_#2 720, belonging to the first group 740, as 'eating broadcast.'

When a second video_#3 730 (for example, a smart phone unboxing video) is inputted, the content editing apparatus may analyze the scenes in the second video_#3 730, and since the similarity of the second video_#3 730 to the second video_#1 710 and the second video_#2 720 in the first group 740 is respectively below the set value, the content editing apparatus may classify the second video_#3 730 into a new second group 750 based on the analysis result (for example, a smart phone (80%), explain (70%), key words=smart phone B, unboxing, image style B, template B), and may determine the category based on the attributes of the second group 750 as 'product introduction.' Accordingly, the content editing apparatus may determine the category of the second video_#3 730, belonging to the second group 750, as a 'product introduction.'

In addition, the content editing apparatus may classify other videos (for example, a second video_4# to a second video_#17) into groups in the same manner as described above, and determine a category based on attributes of the classified groups.

In other words, the content editing apparatus may generate an image classification algorithm through a learning process that classifies the category of the video based on the similarity between numerous videos.

Thereafter, when the first video is received from the personal terminal, the content editing apparatus may determine the category of the first video by applying the image classification algorithm to the first video.

For example, as shown in FIG. 8, upon receiving a first video_#1 810 (for example, a gimbap eating show video) (or an edit request including the first video_#1 810) as the first video from the personal terminal, the content editing apparatus may classify the first video_#1 810 into the first group 740 by applying the image classification algorithm to the first video_#1 (810), and determine the category based on the attributes of the classified first group 750, namely, 'eating show'.

Figure 9:
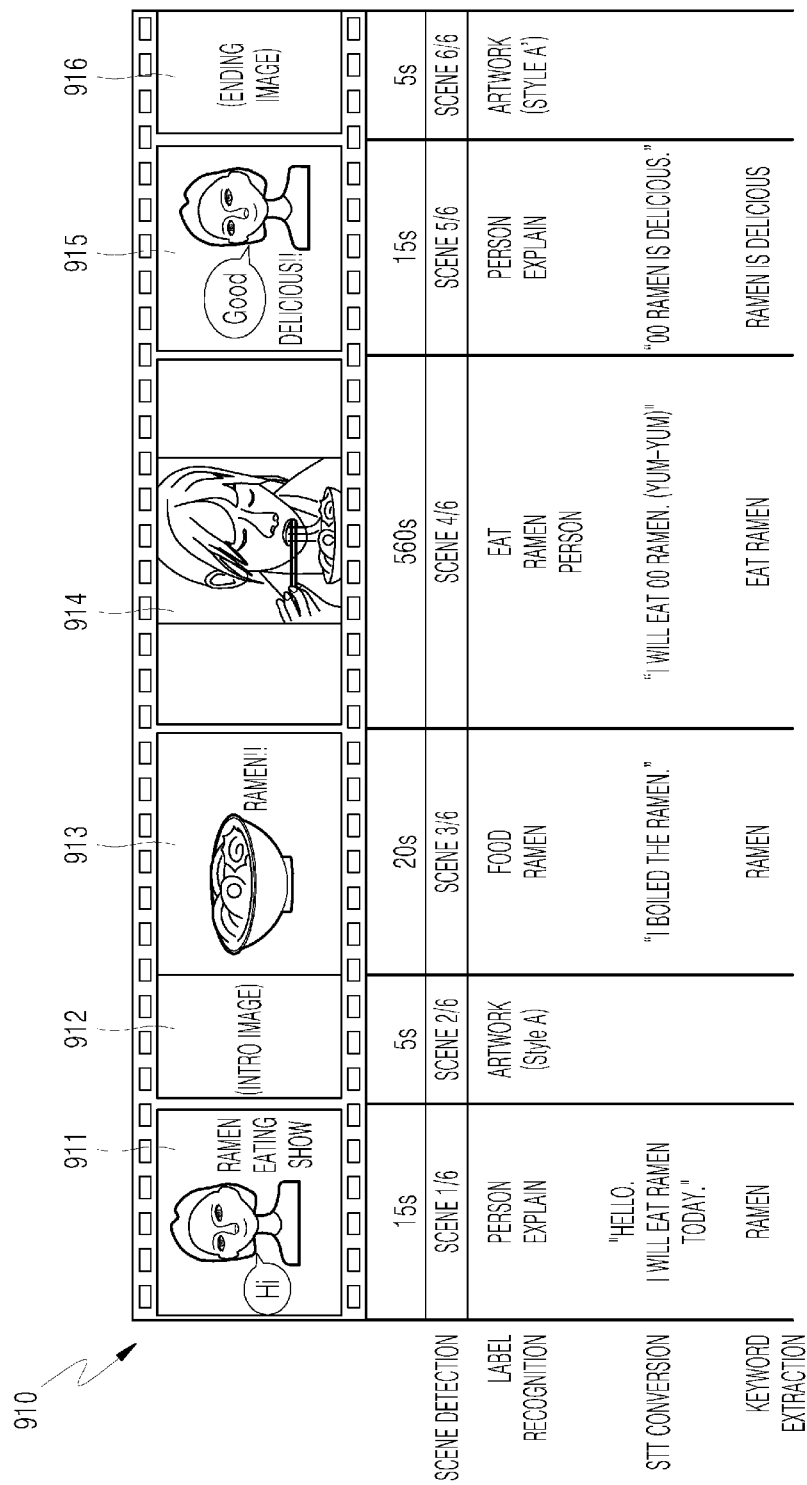
FIG. 9 is a diagram for explaining an example of analyzing a reference video in a content editing apparatus according to an embodiment of the present disclosure.

FIG. 9 is a diagram for explaining an example of analyzing a reference video in a content editing apparatus according to an embodiment of the present disclosure.

Referring to FIG. 9, the content editing apparatus may analyze a reference video. Here, the reference video may be a video to be edited, and may refer to the second video related to the personal terminal (or related to the first video), other than the first video received from the personal terminal.

For example, when a 'ramen' eating show video 910 is received, the content editing apparatus may divide the 'ramen' eating show video 910 into a plurality of scenes and analyze each of the divided scenes. Specifically, the content editing apparatus may divide the 'ramen' eating show video 910 into first to sixth scenes 911 to 916 (shot 1 to shot 6), and extract, for each of the divided first to sixth scenes 911 to 916, scene information such as scene attributes, text, and keywords from the image frames that make up each scene and from recorded speech. In this case, when extracting a text (or a keyword) from the recorded speech, the content editing apparatus may extract the text (or a keyword) using speech to text (STT) technology.

In addition, the content editing apparatus may extract an individual template and a style of the ramen eating show video 910 based on the first to sixth scenes 911 to 916 in the ramen eating show video 910. For example, as a template of an individual, the content editing apparatus may describe a title caption in the first scene 911 as a combination of keywords extracted from an image frame (or recorded speech) ('ramen'+'eat'), and extract the configuration of the second scene 912 as an intro image (for example, artwork style A). The content editing apparatus may configure the third scene 913 as a scene of 'ramen,' which is a theme scene, and extract the configuration of the fourth scene 914 as a scene of eating 'ramen,' which is an additional theme scene. In addition, the content editing apparatus may configure the fifth scene 915 as a later theme scene, describe keyword subtitles (for example, "delicious") extracted from an image frame (or from recorded speech), and extract the configuration of the sixth scene 916 as an ending image (for example, artwork style A).

In addition, the content editing apparatus may extract a font of the title caption (or keyword caption), a style of the intro and ending video, an image filter, and a color state (for example, color temperature, color, chroma, brightness, and contrast) as a personal style.

Figure 10:
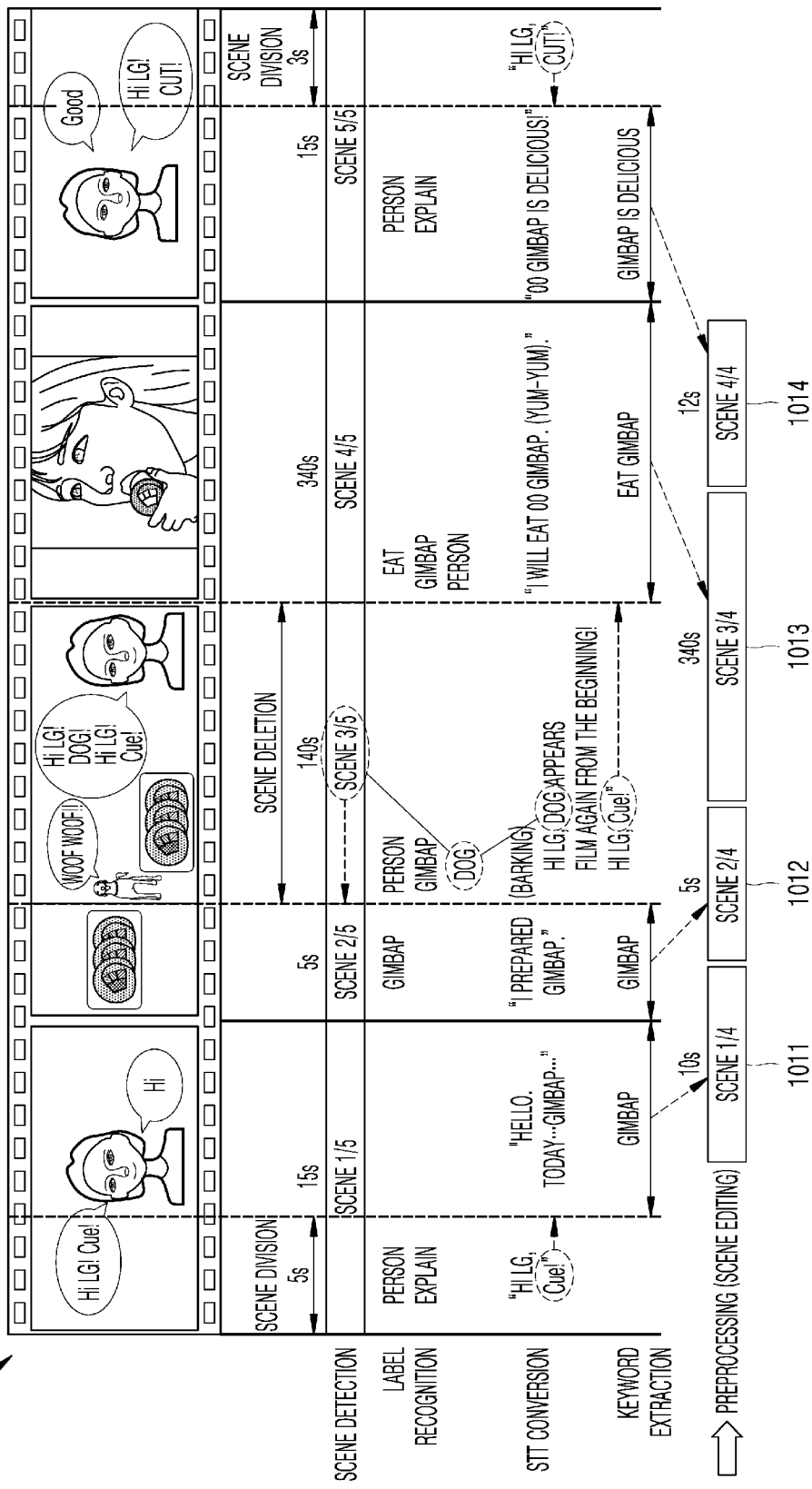
FIG. 10 is a diagram for explaining an example of editing and analyzing a subject video for editing in a content editing apparatus according to an embodiment of the present disclosure.

FIG. 10 is a diagram for explaining an example of editing and analyzing a subject video for editing in a content editing apparatus according to an embodiment of the present disclosure.

Referring to FIG. 10, upon receiving a subject video for editing from an external device (for example, a personal terminal or a memory device), the content editing apparatus may edit and analyze the received video. For example, upon receiving a 'gimbap' eating show video 1010, the content editing apparatus may recognize a wake-up word and an editing command from the 'gimbap' eating show video 1010, and edit the 'gimbap' eating show video 1010 based on the recognized wake-up word and editing command. Since the editing method based on a wake-up word and an editing command has already been described with reference to FIGS. 3 and 4, description thereof will be omitted.

Thereafter, the content editing apparatus may divide the edited 'gimbap' eating show video into four scenes 1011 to 1014, and analyze each of the divided scenes in the same manner as described with reference to FIG. 9. Accordingly, the description thereof will be omitted.

Figure 11:
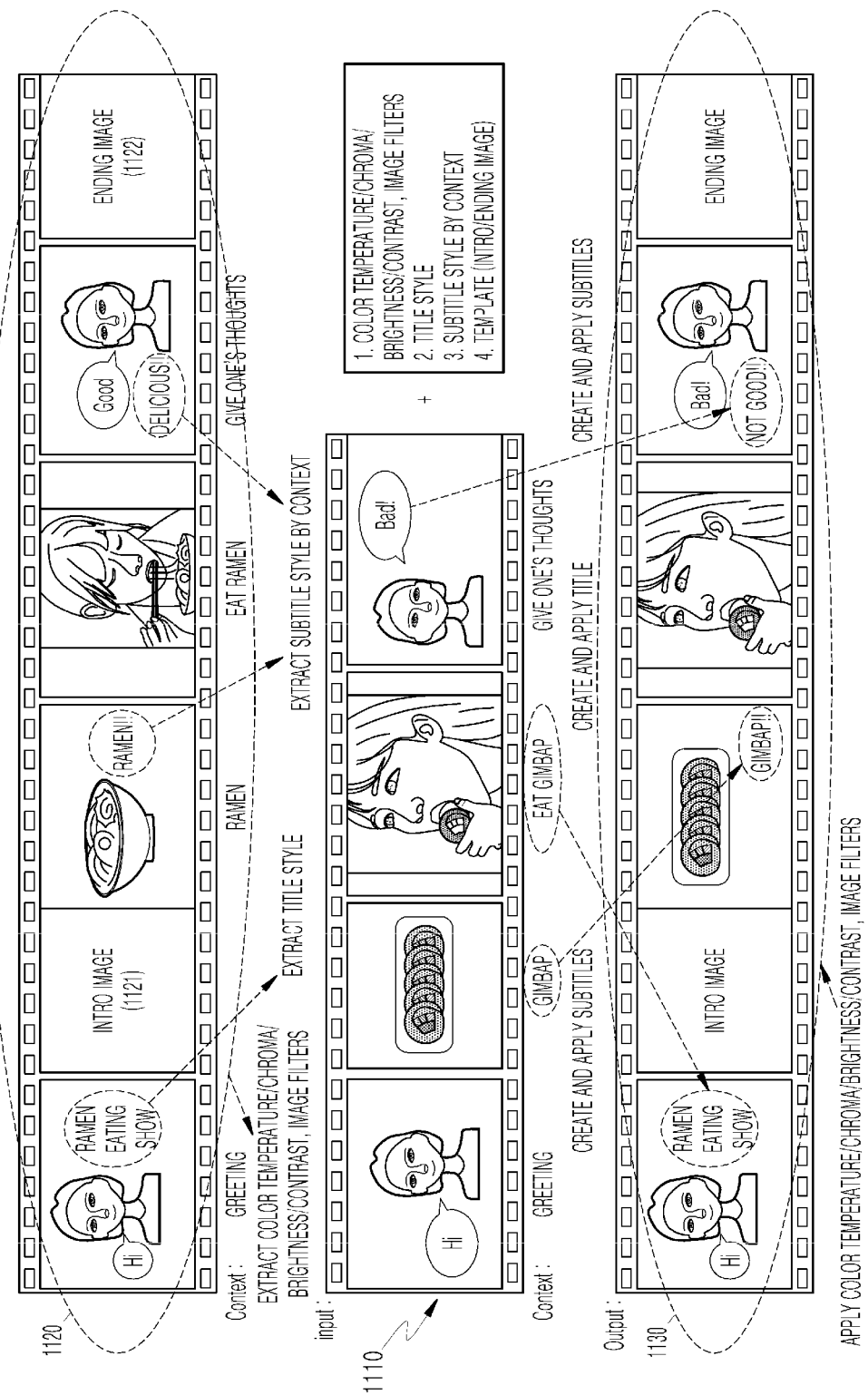
FIG. 11 is a diagram for explaining an example of customized video editing in a content editing apparatus according to an embodiment of the present disclosure.

FIG. 11 is a diagram for explaining an example of customized video editing in a content editing apparatus according to an embodiment of the present disclosure.

Referring to FIG. 11, upon receiving a video, the content editing apparatus may determine the category of the video and edit the video based on a template corresponding to the category of the video.

The content editing apparatus may receive, for example, a 'gimbap' eating show video 1110. Here, the 'gimbap' eating show video 1110 may be a video obtained as a result of subjecting a video provided by the personal terminal to the editing and analysis process shown in FIG. 10.

The content editing apparatus may determine the category of a 'gimbap' eating show video 1110 as 'eating broadcast' based on the set method described above, and acquire a template 1120 corresponding to 'eating broadcast' from a memory. In this case, the content editing apparatus may compare each scene of the 'gimbap' eating show video 1110 and each scene of the template 1120 corresponding to 'eating broadcast,' and may insert into the 'gimbap' eating show video 1110 at some of the scenes that do not correspond to the scenes of the 'gimbap' eating show video 1110 among the scenes of the template 1120 corresponding to 'eating broadcast'. In other words, the content editing apparatus may insert, into the 'gimbap' eating show video 1110, an intro image 1121 and an ending image 1122, which are scenes that do not correspond to the scenes of the 'gimbap' eating show video 1110 among the scenes of the template 1120 corresponding to 'eating broadcast'. Accordingly, an edited 'gimbap' eating show video 1130 can be acquired. The content editing apparatus may also insert the location of the intro image 1121 and the ending image 1122 according to the template 1120 corresponding to 'eating broadcast.'

In addition, the content editing apparatus may change a location (or an order of arrangement) of each scene in the 'gimbap' eating show video 1110 based on the template 1120 corresponding to 'eating broadcast.' For example, if the order of 'gimbap' scene (the second scene) and the 'scene of eating the gimbap' (the third scene) is reversed (that is, the 'gimbap' scene is placed after the 'scene of eating gimbap'), the content editing apparatus may change the 'gimbap' scene to the 'scene of eating gimbap' based on the template 1120 corresponding to 'eating broadcast.'

In addition, the content editing apparatus may change a style of the scene of the 'gimbap' eating show video 1110 based on at least one of color, chroma, brightness, an applied image filter, title style, subtitle style, intro image style, or ending image style of the scene of the template 1120 corresponding to 'eating broadcast.'

As a result, the content editing apparatus may edit the received 'gimbap' eating show video 1110 based on the style of each scene of the template 1120 corresponding to 'eating broadcast,' and output the edited 'gimbap' eating show video 1130, thereby creating a video that is customized for each individual.

Figure 12:
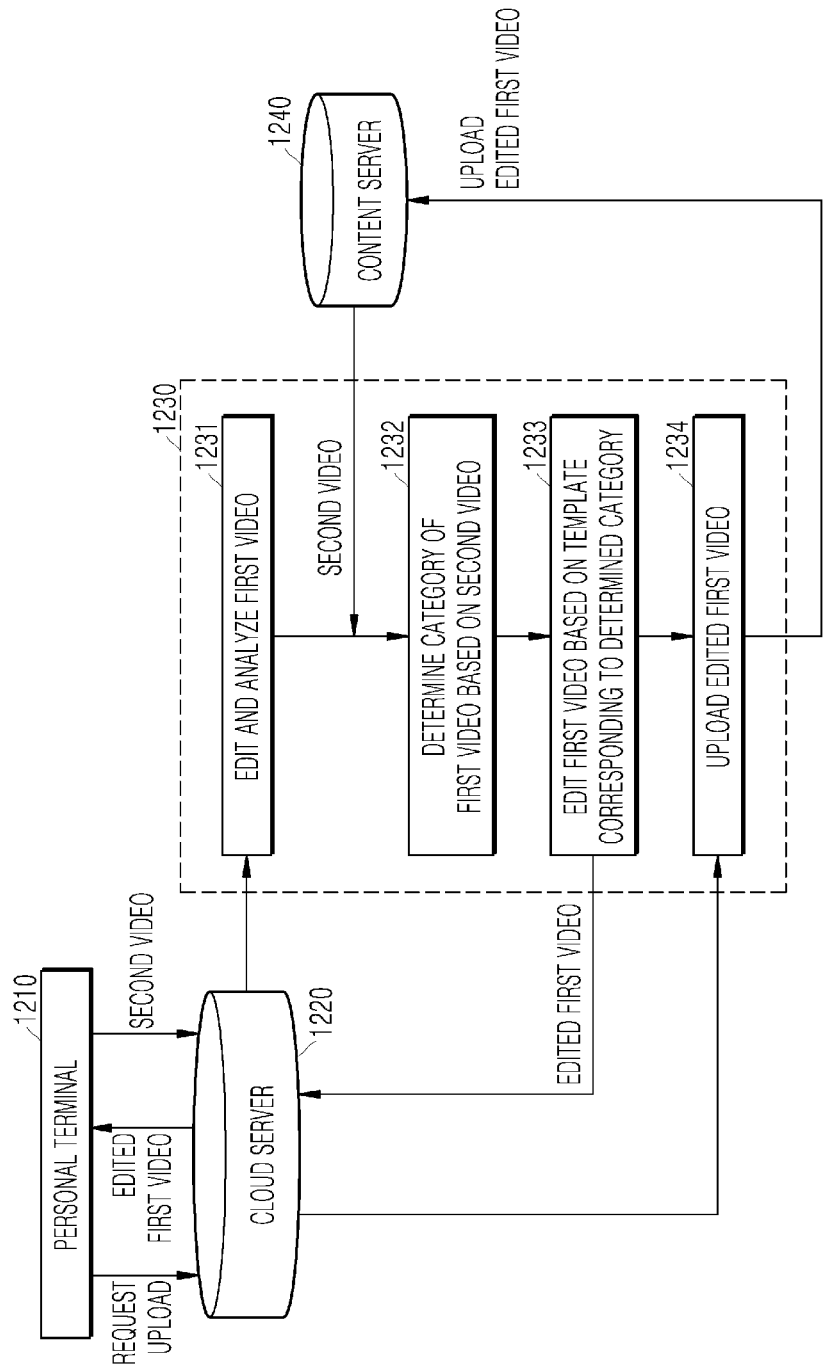
FIG. 12 is a diagram for explaining a process of receiving and editing a video and uploading the edited video in a content editing apparatus according to an embodiment of the present disclosure.

FIG. 12 is a diagram for explaining a process of receiving and editing a video and uploading the edited video in a content editing apparatus according to an embodiment of the present disclosure.

Referring to FIG. 12, a personal terminal 1210 may film a first video, and transmit the filmed first video, for example, to a content editing apparatus 1230 through a cloud server 1220.

The content editing apparatus 1230 may edit and analyze the first video (1231).

The content editing apparatus 1230 may acquire a second video (for example, a video uploaded to a content server 1240 according to a personal account for content of the personal terminal 1210) associated with the personal terminal 1210 from the content server 1240.

The content editing apparatus 1230 may determine a category of the first video based on a second video (1232).

The content editing apparatus 1230 may edit the first video based on the template corresponding to the determined category (1233).

The content editing apparatus 1230 may transmit the edited first video to the personal terminal 1210 through the cloud server 1220 to check the editing result.

When the content editing apparatus 1230 receives an upload request for the edited first video from the personal terminal 1210 through the cloud server 1220, the edited first video may be transmitted to the content server 1240 and uploaded (1234).

Here, the content editing apparatus 1230 may communicate with the personal terminal 1210 through the cloud server 1220 to back up data (for example, a first video and the edited first video) to the cloud server 1220, but is not limited thereto, and may directly communicate with the personal terminal 1210.

Figure 13:
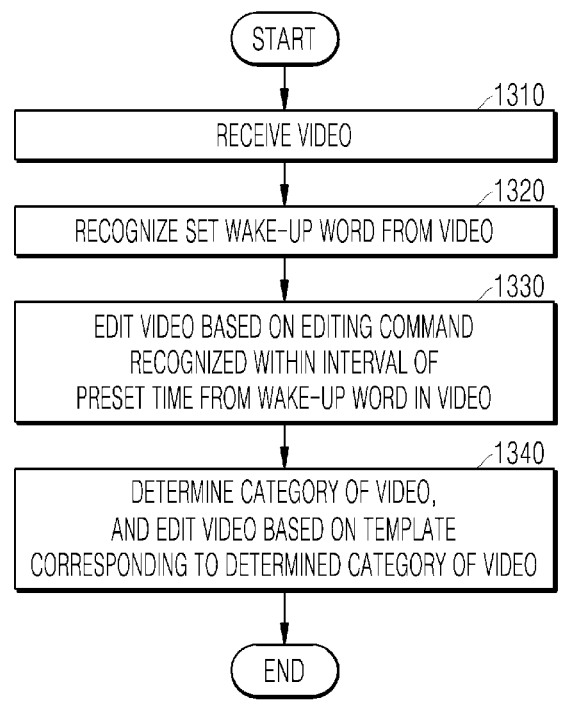
FIG. 13 is a flowchart illustrating a method for editing content according to an embodiment of the present disclosure.

FIG. 13 is a flowchart illustrating a method for editing content according to an embodiment of the present disclosure. The content editing apparatus implementing the method for editing content may include an interface, a processor, and a memory. In addition, an image classification algorithm this is applied to a video to determine a category of the video may be pre-stored in the memory of the content editing apparatus. The image classification algorithm may be a machine learning-based learning model that is pre-trained to classify the category of a video based on a context within each scene of a plurality of videos.

Referring to FIG. 13, in step S1310, the interface of the content editing apparatus may receive a video from a personal terminal (for example, a camcorder, a digital camera, and a smartphone). Here, the video may be a video related to any one of various types of content.

Upon receiving the video (a first video) from the personal terminal, the interface of the content editing apparatus may request another video (a second video) associated with the personal terminal (or associated with the first video) from a content server, and receive another video from the content server.

The processor of the content editing apparatus may set a plurality of categories based on the received other video and generate a template for each of the set plurality of categories, or receive a template for each of the plurality of categories from the content server through the interface. The processor of the content editing apparatus may store a template for each of the plurality of categories in the memory.

Thereafter, the processor of the content editing apparatus may edit the received video.

Specifically, in step S1320, the processor of the content editing apparatus may recognize a set wake-up word from the video.

In step S1330, the processor of the content editing apparatus may edit the video based on an editing command (for example, an image start command, an image end command, and an additional command) recognized within an interval of a preset time from a portion (or point of time) where the wake-up word of the video is located.

Specifically, among the editing commands, the processor of the content editing apparatus may recognize an image start command and an image end command, and may edit the video based on an image frame from a first time point corresponding to the image start command to a second time point corresponding to the image end command in the video. Here, when there are a plurality of acquired image frames, the content editing apparatus may edit the video by connecting the plurality of image frames such that the plurality of image frames are reproduced in the order in which they were acquired (or filmed).

In addition, among the editing commands, the processor of the content editing apparatus may recognize an additional command related to a context, and edit the video based on at least one image frame corresponding to the context of the additional command in the video. Here, the processor of the content editing apparatus may change the location of at least one image frame corresponding to the context of the additional command in the video. For example, when connecting the plurality of image frames acquired from the received video, the processor of the content editing apparatus may change the connecting parts based on an additional command related to the context (for example, filming from before the appearance of a 'dog').

In step S1340, the processor of the content editing apparatus may determine a category of the video, and edit the video based on a template corresponding to the determined category of the video. In this case, the processor of the content editing apparatus may determine the category of the video based on a set plurality of categories (for example, 'eating broadcast,' 'VLOG,' or 'product introduction'), or determine the category of the video by applying an image classification algorithm to the video.

When editing a video using the template, the processor of the content editing apparatus may compare a scene structure of the video edited based on the wake-up word and the editing command with a scene structure of the template, and may edit the video based on the scene structure of the template. Specifically, the processor of the content editing apparatus may compare each scene of the video with each scene of the template, and insert into the video at least some of the scenes of the template that do not correspond to the scenes of the video. For example, as a result of comparing each scene of the video with each scene of the template, if the video does not include an intro image (or scene) and an ending image (or scene), the processor of the content editing apparatus may insert and edit the intro image and ending image in the template. In this case, the processor of the content editing apparatus may edit the video by inserting the intro image and the ending image into the video by referring to the locations of each of the intro image and the ending image in the template.

In addition, the processor of the content editing apparatus may check whether each scene of the video corresponds to each scene of the template, and change a style of a scene of the video based on a style of the a of the template corresponding to the scene of the video. When changing the style of a scene, the processor of the content editing apparatus may change the style of the scene of the video based on at least one of color, chroma, brightness, an applied image filter, title style, or subtitle style of the scene of the template corresponding to the scene of the video, thereby editing the video in a manner that suits an individual's taste.

The exemplary embodiments described above may be implemented through computer programs executable through various components on a computer, and such computer programs may be recorded in computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A content editing apparatus comprising:
a processor;
a memory operatively connected to the processor, the memory storing at least one code configured to be executed by the processor; and
an interface configured to receive a video,
wherein the memory stores a code configured to, when executed by the processor, cause the processor to:
recognize a set wake-up word from the video; and
edit the video based on an editing command recognized within an interval of a preset time from a portion where the wake-up word of the video is located; and
wherein the editing includes:
determining a category of the video;
comparing each scene of the video with each scene of a template corresponding to the category of the video; and
inserting into the video at least some scenes that do not correspond to the scenes of the video among the scenes of the template.

2. The content editing apparatus of claim 1, wherein the memory further stores a code configured to cause the processor to:
recognize an image start command and an image end command among editing commands; and
edit the video based on an image frame from a first time point corresponding to the image start command to a second time point corresponding to the image end command in the video.

3. The content editing apparatus of claim 1, wherein the memory further stores a code configured to cause the processor to:
recognize an additional command related to a context among the editing commands; and
edit the video based on at least one image frame corresponding to the context of the additional command in the video.

4. The content editing apparatus of claim 3, wherein the memory further stores a code configured to cause the processor to change a location of at least one image frame corresponding to the context of the additional command in the video.

5. The content editing apparatus of claim 1, wherein the memory further stores a code configured to cause the processor to:
determine the category of the video based on a set plurality of categories or determine the category of the video by applying an image classification algorithm to the video.

6. The content editing apparatus of claim 5, wherein the image classification algorithm is a machine learning-based learning model that is pre-trained to classify a category of a video based on a context within each scene of a plurality of videos.

7. The content editing apparatus of claim 1, wherein the memory further stores a code configured to cause the processor to:
check whether each scene of the video corresponds to each scene of the template; and
change a style of a scene of the video based on a style of a scene of the template corresponding to the scene of the video.

8. The content editing apparatus of claim 7, wherein the memory further stores a code configured to cause the processor to change the style of the scene of the video based on at least one of color, chroma, brightness, an applied image filter, title style, or subtitle style of a scene of the template corresponding to the scene of the video.

9. The content editing apparatus of claim 1, wherein the memory further stores codes configured to:
cause the interface to:

request a content server for another video associated with a personal terminal in response to receiving the video from the personal terminal; and receive another video from the content server; and cause the processor to:

set a plurality of categories based on the received other video and create a template for each of the set plurality of categories or receive the template for each of the plurality of categories from the content server through the interface; and store the template for each of the plurality of categories in the memory.

10. A method for editing content, performed by a content editing apparatus comprising a processor, the method comprising:

receiving a video, by an interface of the content editing apparatus;

recognizing, by the processor, a set wake-up word from the video; and editing, by the processor, the video based on an editing command recognized within an interval of a preset time from a portion where the wake-up word of the video is located, wherein the editing of the video comprises determining a category of the video, comparing each scene of the video with each scene of a template corresponding to the category of the video, and inserting into the video at least some scenes of the template that do not correspond to the scenes of the video.

11. The method of claim 10, wherein the editing of the video further comprises:

before determining the category of the video, recognizing an image start command and an image end command among editing commands; and editing the video based on an image frame from a first time point corresponding to the image start command to a second time point corresponding to the image end command in the video.

12. The method of claim 10, wherein the editing of the video further comprises:

before determining the category of the video, recognizing an additional command related to a context among the editing commands; and editing the video based on at least one image frame corresponding to the context of the additional command in the video.

13. The method of claim 12, wherein the editing of the video based on at least one image frame corresponding to a context of the additional command comprises changing a location of at least one image frame corresponding to the context of the additional command in the video.

14. The method of claim 10, wherein the determining a category of the video comprises:

determining t category of the video based on a set plurality of categories, or determining the category of the video by applying an image classification algorithm to the video.

15. The method of claim 10, wherein the editing of the video further comprises checking whether each scene of the video corresponds to each scene of the template, and changing a style of a scene of the video based on a style of a scene of the template corresponding to the scene of the video.

16. The method of claim 15, wherein the changing of a style of a scene of the video comprises changing the style of the scene of the video based on at least one of color, chroma, brightness, an applied image filter, title style, or subtitle style of a scene of the template corresponding to the scene of the video.

17. The method of claim 10, further comprising:

after receiving of the video, by the interface, requesting a content server for another video associated with a personal terminal in response to receiving the video from the personal terminal, and receiving another video from the content server;

by the processor, setting the plurality of categories based on the received other video and generating a template for each of the set plurality of categories, or receiving a template for each of the plurality of categories from the content server through the interface; and by the processor, storing the template for each of the plurality of categories in a memory.

* * * * *